US012216487B2

(12) United States Patent
Abusleme Hoffman et al.

(10) Patent No.: US 12,216,487 B2
(45) Date of Patent: Feb. 4, 2025

(54) PROTECTION VOLTAGE GENERATING CIRCUIT WITH MONOTONIC AND STABLE POWER SUPPLY VOLTAGE BEHAVIOR

(71) Applicant: CIRRUS LOGIC INTERNATIONAL SEMICONDUCTOR LTD., Edinburgh (GB)

(72) Inventors: Angel C. Abusleme Hoffman, Austin, TX (US); Axel Thomsen, Austin, TX (US)

(73) Assignee: CIRRUS LOGIC, INC., Austin, TX (US)

( * ) Notice: Subject to any disclaimer, the term of this patent is extended or adjusted under 35 U.S.C. 154(b) by 214 days.

(21) Appl. No.: 18/077,402

(22) Filed: Dec. 8, 2022

(65) Prior Publication Data

US 2024/0192715 A1 Jun. 13, 2024

(51) Int. Cl.
*G05F 1/571* (2006.01)
*G05F 1/46* (2006.01)

(52) U.S. Cl.
CPC .............. *G05F 1/571* (2013.01); *G05F 1/461* (2013.01); *G05F 1/465* (2013.01)

(58) Field of Classification Search
CPC . G05F 1/571; G05F 1/46; G05F 1/461; G05F 1/465; H03F 3/45; H03K 17/082
USPC ...................................... 361/86–87, 91.1, 92
See application file for complete search history.

(56) References Cited

U.S. PATENT DOCUMENTS 9,191,001 B2 11/2015 Amadi
2007/0290722 A1* 12/2007 Jang .................. H05B 41/2855 327/52
2012/0212205 A1* 8/2012 Yamada ................ H02M 3/156 323/284
2013/0140990 A1* 6/2013 Campos ................. H05B 45/58 315/120
2021/0103306 A1 4/2021 Hwang et al.
2021/0367383 A1* 11/2021 Dhanasekaran ....... H02H 9/041

OTHER PUBLICATIONS

Prommee, et al., "CMOS WTA maximum and minimum circuits with their applications to analog switch and rectifiers", Microelectronics Journal 42, 2011, pp. 52-62, Netherlands (pp. 1-11 in pdf).

(Continued)

*Primary Examiner* — Danny Nguyen
(74) *Attorney, Agent, or Firm* — Mitch Harris, Atty at Law, LLC; Andrew M. Harris

(57) ABSTRACT

A circuit and method for generating a protection voltage includes a pair of voltage-generating circuits that generate voltages from the power supply voltage. The voltages have a differing dependence on the power supply voltage so that a difference between the first voltage and the second voltage changes sign for a particular value of the power supply voltage. The voltages are supplied to a protection voltage generating circuit that includes a pair of amplifiers having inputs that receive a respective one of the voltages and each of the amplifiers provides negative feedback to the other. An output circuit generates the protection voltage according to a maximum or a minimum value among the amplifier outputs, so that the protection voltage is monotonic with respect to variation of the power supply voltage.

24 Claims, 5 Drawing Sheets

(56) References Cited

OTHER PUBLICATIONS

Chauhan, et al., "Fail-Safe I/O to Control RESET# Pin of DDR3 SDRAM and Achieve Ultra-Low System Power", IEEE 16$^{th}$ Int'l Symposium on Quality Electronic Design, Mar. 2015, pp. 357-360, Santa Clara, CA (pp. 1-4 in pdf).
Combined Search and Examination Report (CSER) in GB2318141.5, May 23, 2024 (pp. 1-9 in pdf).

* cited by examiner

PROTECTION VOLTAGE GENERATING CIRCUIT WITH MONOTONIC AND STABLE POWER SUPPLY VOLTAGE BEHAVIOR

BACKGROUND

1. Field of Disclosure

The field of representative embodiments of this disclosure relates to protection voltage generation circuits, and in particular, to a protection voltage generating circuit with monotonic and stable behavior over a wide range of power supply voltages.

2. Background

Protection circuits are commonly required in metal-oxide semiconductor (MOS) circuits that interface to external voltage sources, such circuit nodes connected to input/output (IO) pins, as well as in other circuits where an over-voltage or under-voltage condition may occur. Traditionally, a circuit with a known power supply voltage has been protected by a simple diode arrangement that permits the voltage at the protected node to only rise a single threshold-voltage drop above or below the power supply voltage.

However, at startup or during transitions between powered and un-powered modes in a subsystem, and in particular where the power supply voltage cannot be presumed to be constant, but rather, a continuously increasing positive or decreasing negative power supply voltage during transitions of the power supply voltage, the protected nodes may need protection from voltages that have a characteristic that is more complex and dependent on a combination of two or more voltages within the circuit. Under such conditions, a simple passive minimum selector has been used for positive protection voltages, or a simple maximum detector has been used for negative protection voltages. Referring to FIG. 1A, an example of such a prior art protection voltage generating circuit 10A is shown, consisting of two transistors having sources connected to, for example two different input voltages, one that provides a nominally constant output voltage for one region of a positive power supply voltage $V_{DD}$ and another that provides an output voltage that increases with increasing positive power supply voltage. A pair of transistors P1 and P2 have their gate terminals and source terminals cross-coupled, so that whichever of voltages VR1+ or VR2+ is greater, the lower-voltage one of voltages VR1+ or VR2+ will be pulled to that greater voltage, forming an automatic multiplexer that selects the maximum as between the inputs provided by voltages VR1+ or VR2+. Referring to FIG. 1B, a similar protection voltage generating circuit 10B is generally provided from a negative power supply $V_{SS}$, in which transistors P1 and P2 of FIG. 1A are replaced with NFETs N1 and N2, respectively, in order to protect PFET devices in the protected circuit by generating a protection voltage equal to a minimum voltage as between voltages VR1− or VR2−.

Protection voltage generating circuits 10A and 10B, provide adequate operation when the power supply differential between positive power supply voltage $V_{DD}$ and negative power supply voltage $V_{SS}$ is at a normal operating voltage, e.g., after startup, or for battery-powered circuits, when the battery voltage is in the battery's nominal range of operation. However, in lower voltage ranges of operation for $V_{DD}-V_{SS}$, voltages VR1+, VR2+ may approach an equal value, causing a region of power supply voltage differential $V_{DD}-V_{SS}$ in which protection voltage generating circuits 10A and 10B operate linearly or in an unstable manner, because both transistors P1 and P2 (or N1 and N2) will remain on together, or toggle. Also, when voltages VR1+, VR2+ are equal or close to equal, both of transistors P1 and P2 become diode-connected, resulting in a voltage difference between the inputs of voltage generating circuits 10A and 10B and the output equal to a threshold voltage of transistors P1 and P2, resulting in a non-monotonic transfer characteristic. FIG. 2 illustrates operation of voltage generating circuits 10A and 10B over a range of operation for $V_{DD}-V_{SS}$ represented by curve 16. FIG. 2 illustrates an example of both desirable operation in the right half of the graph, but non-monotonic and potentially unstable operation in the region $2.0V<V_{DD}<2.65V$, as curve 12A of output voltage VR2+ crosses curve 12B of output voltage VR1+, i.e., the difference between output voltage VR2+ and output voltage VR1+ changes sign. Similar operation is also seen in curve 14A of voltage VR2− and curve 14B of voltage VR1−.

Therefore, it would be advantageous to provide a protection voltage generating circuit that has monotonic and stable behavior over a range of power supply voltages.

SUMMARY

Monotonic and stable behavior over a range of power supply voltages is achieved in a protection voltage generating circuit and its method of operation.

The circuit includes a first circuit for generating a first voltage from a power supply voltage, a second circuit that generates a second voltage from the power supply voltage. The first voltage and the second voltage have a differing dependence on the power supply voltage so that a difference between the first voltage and the second voltage changes sign for a particular value of the power supply voltage. The circuit includes a first amplifier circuit having an input coupled to an output of the first circuit and receives the first voltage, and that generates a first output voltage. The circuit also includes a second amplifier circuit having an input coupled to an output of the second circuit and receives the second voltage, and that generates a second output voltage. The first amplifier circuit provides negative feedback to the second amplifier circuit, and the second amplifier circuit provides negative feedback to the first amplifier circuit. The circuit also includes an output circuit that receives the first output voltage from the first amplifier circuit and the second output voltage from the second amplifier circuit and generates the protection voltage according to a maximum or a minimum value among the first output voltage and the second output voltage, so that the protection voltage is monotonic with respect to variation of the power supply voltage in a region of the power supply voltage including the particular value of the power supply voltage.

The summary above is provided for brief explanation and does not restrict the scope of the claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DETAILED DESCRIPTION OF ILLUSTRATIVE EMBODIMENT

The present disclosure encompasses circuits, integrated circuits and their methods of operation, that generate protection voltages to prevent over-voltage or under-voltage conditions at circuit nodes that could be damaged or otherwise operate improperly. The circuit includes two circuits that generate a first and second voltage from a power supply voltage. The first voltage and the second voltage have a differing dependence on the power supply voltage so that a difference between the first voltage and the second voltage changes sign for a particular value of the power supply voltage. The circuit includes a pair of amplifier circuits that receive respective ones of the voltage and provide negative feedback to each other, and an output circuit that generates a protection voltage according to a maximum or a minimum value among voltages at the outputs of the amplifiers, so that the protection voltage is monotonic with respect to variation of the power supply voltage in a region of the power supply voltage including the particular value of the power supply voltage.

Figure 3:
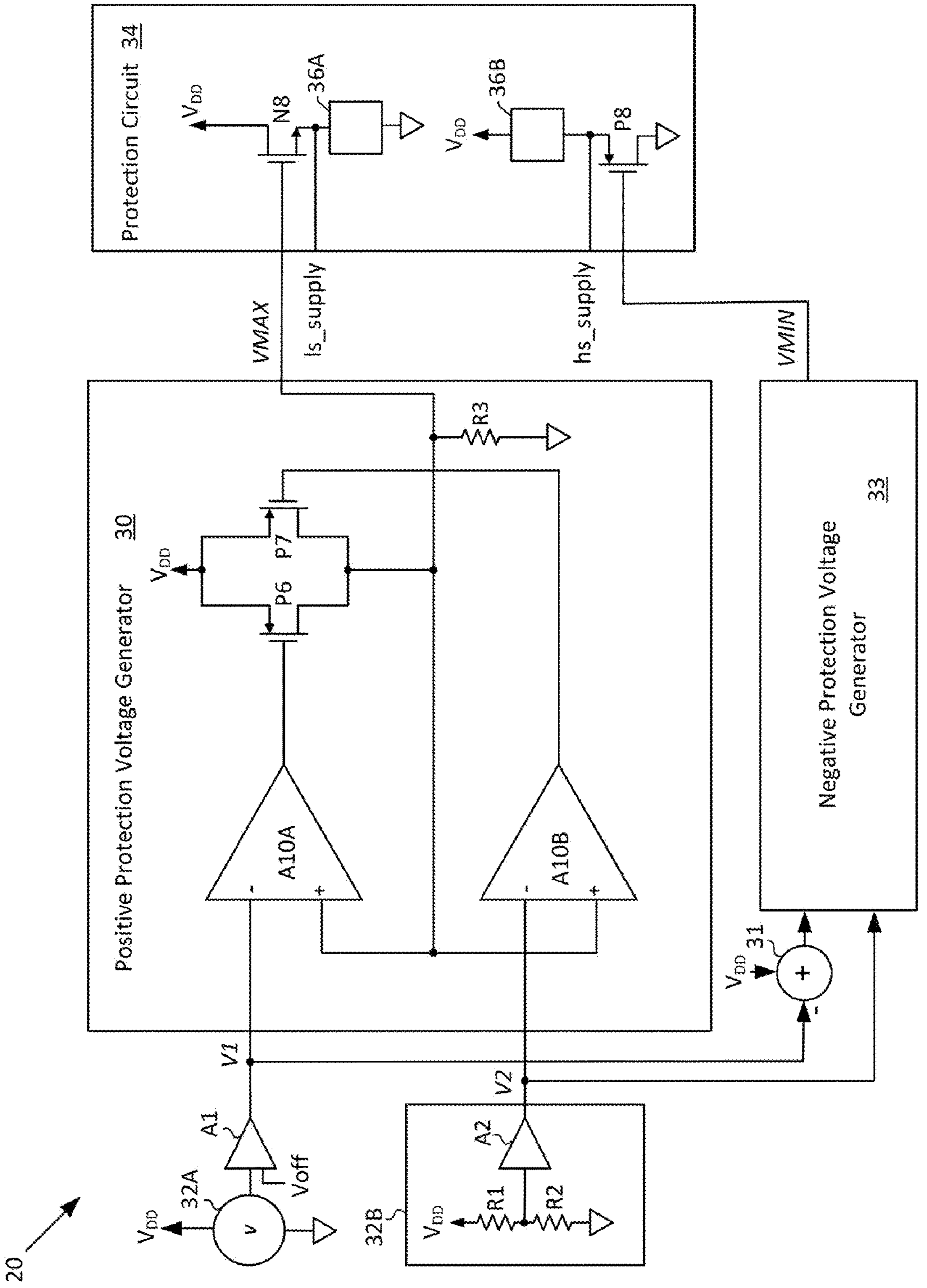
FIG. 3 is a simplified schematic diagram illustrating an example protection circuit 20, in accordance with an embodiment of the disclosure.

Referring now to FIG. 3, a simplified schematic diagram illustrating an example protection circuit 20 is shown, in accordance with an embodiment of the disclosure. A protection block 34, provides over-voltage protection for a circuit node 36A, by biasing a transistor N8 so that the voltage on a power supply ls_supply does not exceed a voltage greater than the voltage of a power supply ls_supply than a threshold voltage of transistor N8. Protection block 34 also provides under-voltage protection for a circuit node 36B, by biasing a transistor P8 so that the voltage on a power supply hs_supply does not fall below a voltage less than the voltage of power supply hs_supply by more than a threshold voltage of transistor P8. Biasing of transistor N8 is performed by an output voltage VAMX of a positive protection voltage generator 30 that includes a pair of amplifiers A10A, A10B that receive voltages V1, V2 at their respective inputs. Amplifiers A10A, A10B generate outputs provided as inputs to an output stage formed by transistors P6, P7, which allows for operation at voltages very close to power supply voltage $V_{DD}$, while the outputs of amplifiers A10A, A10B, are only required to operate to voltage $V_{DD}-V_T$, where $V_T$ is the threshold voltage of transistors P6, P7. Effectively, transistors P6, P7 operate as voltage-controlled current sources, yielding a low-headroom topology that can approach power supply voltage $V_{DD}$ without entering cut-off. A resistor R3 provides a path for return current from transistors P6, P7, and is generally required for a capacitive load such a sole connection to the gate of transistor N8, as illustrated. The depicted circuit has the advantage of a high input impedance at the inputs of amplifiers A10A, A10B and a low output impedance. Because the output stage formed by transistors P6, P7 is inverting, the connection of the output of output stage to the non-inverting input terminals of both of amplifiers A10A, A10B provides negative feedback to both of amplifiers A10A, A10B and whichever one of voltages V1, V2 has a higher voltage that input to positive protection voltage generator 30 will dominate, turning on the respective one of transistors P6 or P7 more fully-on, so that output voltage VMAX will follow the greater one of voltages V1, V2.

Figure 1A:
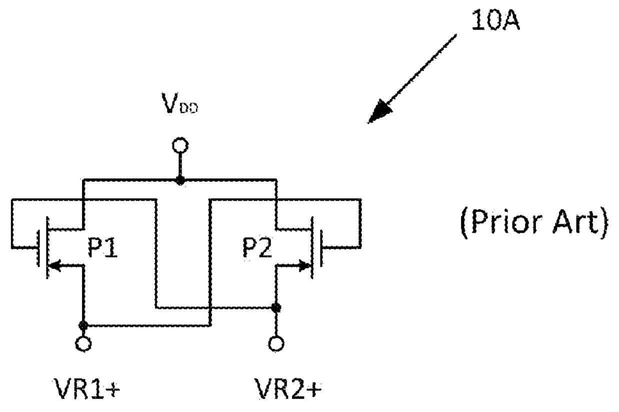
FIG. 1A and FIG. 1B are schematic diagrams of protection voltage generating circuits 10A and 10B, as used in prior art protection voltage generating circuits.
Figure 1B:
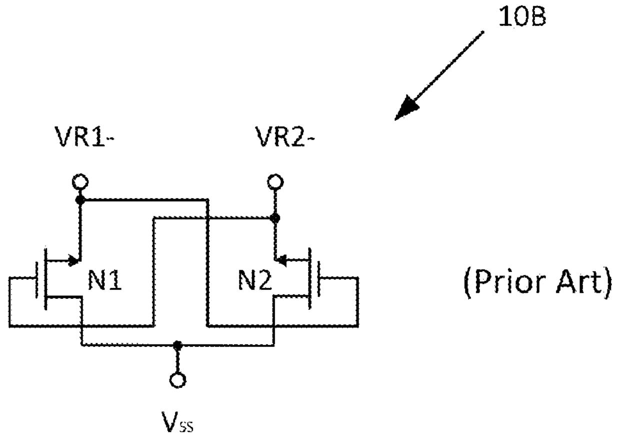
Figure 2:
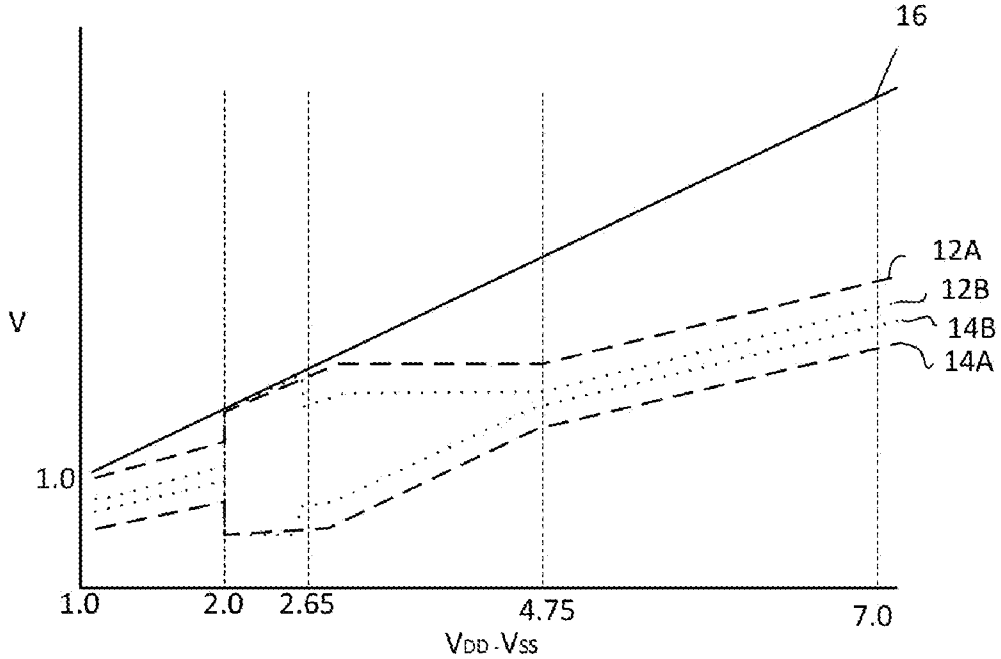
FIG. 2 is a graph illustrating performance of the performance of protection voltage generating circuits 10A and 10B over a range of power supply voltage.

Voltage V1 is provided at the inverting input of positive protection voltage generator 30 by a bandgap voltage reference 32A, as scaled by an amplifier A1, and as offset by an offset voltage $V_{off}$, as needed, to provide a proper protection voltage value in a lower portion of a range of power supply voltage $V_{DD}$. Input voltage V2 is provided by a supply-dependent voltage reference 32B that uses a voltage divider formed by resistors R1 and R2 of equal resistance and a buffer amplifier A2, to generate output voltage $V2=V_{DD}/2$. In the example of FIG. 2, input voltage V2 is less than input voltage V1 for $V_{DD}-V_{SS}$ less than approximately 2.65V, where the difference between input voltage V2 and input voltage V1 changes sign. Negative protection voltage generator 33 receives voltage V2 and also a voltage equal to $V_{DD}-V1$ generated by a combiner 31. Negative protection voltage generator is substantially identical to positive protection voltage generator 30, except that the output stage is formed by NFET transistors, the resistor returning the output current is connected to power supply voltage $V_{DD}$, and the output of negative protection voltage generator VMIN thereby produces a voltage corresponding to a lesser one of input voltage $V_{DD}-V1$ and voltage V2. Generally, output voltage VMAX corresponds to the right-hand portion of curve 12A of FIG. 2, but does not exhibit the cross-over in the left-hand side of the graph of FIG. 2 and output voltage VMAX instead remains monotonic with an increase or decrease of power supply voltage $V_{DD}$, because of the negative feedback arrangement of amplifiers A10A, A10B. Similarly, output voltage VMIN corresponds to the right-hand portions of curve 14A of FIG. 2, but does not exhibit the cross-over in the left-hand side of the graph of FIG. 2 and output voltage VMIN instead remains monotonic with an increase or decrease of power supply voltage $V_{DD}$.

Figure 4:
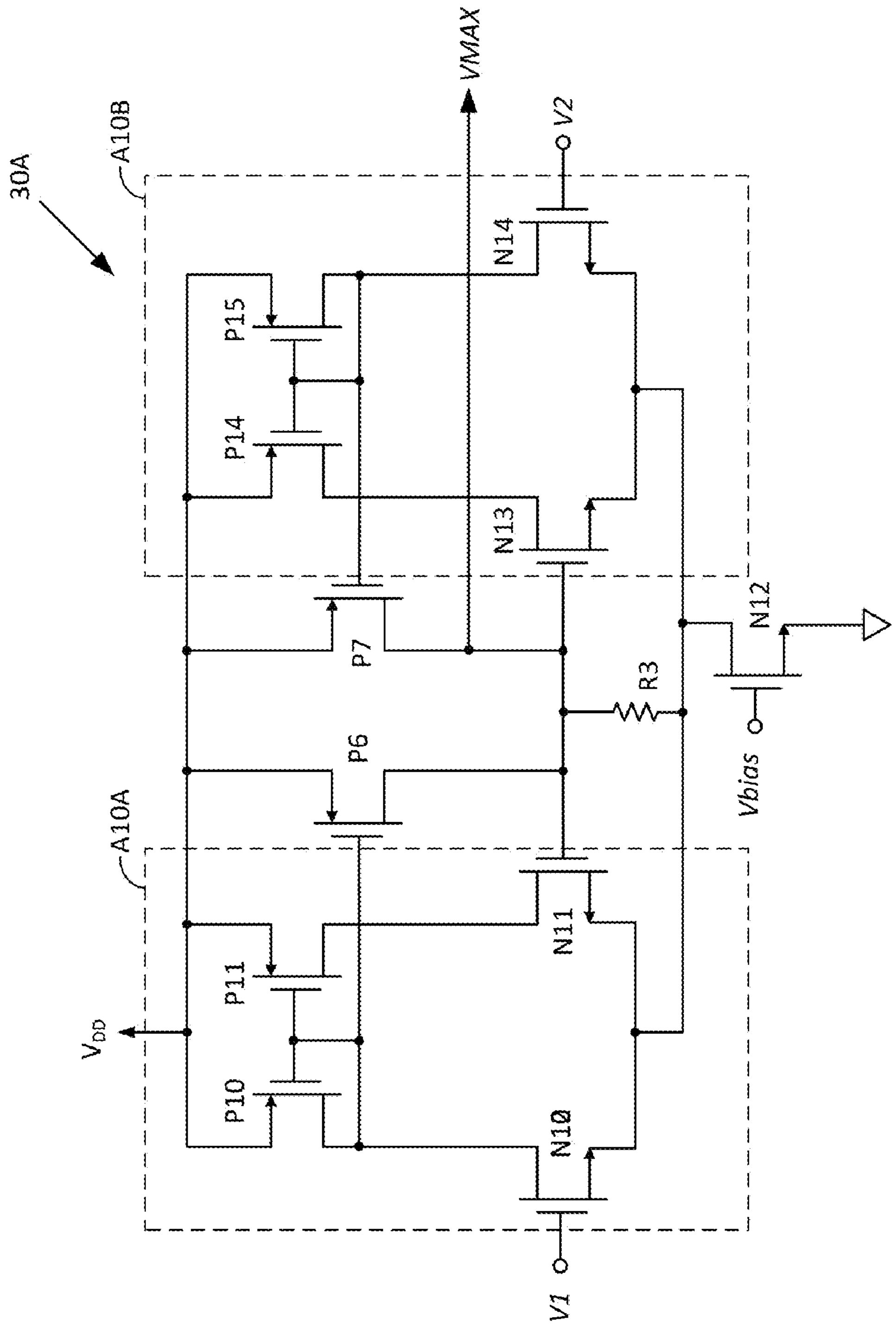
FIG. 4 is a schematic diagram illustrating an example protection voltage generating circuit 30A that may be used in place of protection voltage generating circuit 30 in example protection circuit 20 of FIG. 3, in accordance with another embodiment of the disclosure.

Referring now to FIG. 4, a schematic diagram illustrating an example protection voltage generating circuit 30A that may be used in place of protection voltage generating circuit 30 in protection circuit 20 of FIG. 3 is shown, in accordance with another embodiment of the disclosure. Protection voltage generating circuit 30A includes amplifier A10A and amplifier A10B. In each of amplifiers A10A, A10B, a differential input stage is provided by a pair of NFET transistors N10, N11 in amplifier A10A and NFET transistors P13, P14 in amplifier A10B. Operating current to the differential stages is provided from current mirrors formed by a pair of PFET transistors P10, P11, in amplifier A10A, and PFET transistors P14, P15 in amplifier A10B, that provide inputs to the output stage formed by PFET transistors P6, P7 as described above. Rather than using a highest-gain output of the differential stages, distinguished by connection to the output side of the current the mirrors, a lower-gain outputs that connect from the input side of the current mirrors are used to provide the signals to the gates of transistors P6, P7 of the output stage, which improves the phase margin, and therefore, the stability, of amplifiers A10A, A10B. Alternatively, the higher-gain output of the differential stages could be used. Since the common-mode voltages at the inputs of the differential stages, i.e., voltages V1 and V2 at the gates of transistors N10 and N14, respectively, are related, a common foot device N12 can be used to provide a path for their return currents, and the common source connections of the differential stages provides a common negative feedback node. The current level in protection voltage generating circuit 30A is set by a bias voltage Vbias provided to foot device N12. Protection voltage generating circuit 30A illustrates negative feedback provided by a common node connection at the drain connections of transistors P12 and P13, which is also connected to the gates of transistors N11 and N13. An implementation of negative protection voltage generator 33 in FIG. 3 may be realized by replacing all of the NFET devices in protection voltage generating circuit 30A with PFET devices, replacing all of the PFET devices protection voltage generating circuit 30A with NFET devices, and exchanging power supply $V_{DD}$ with ground, and vice-versa.

Figure 5:
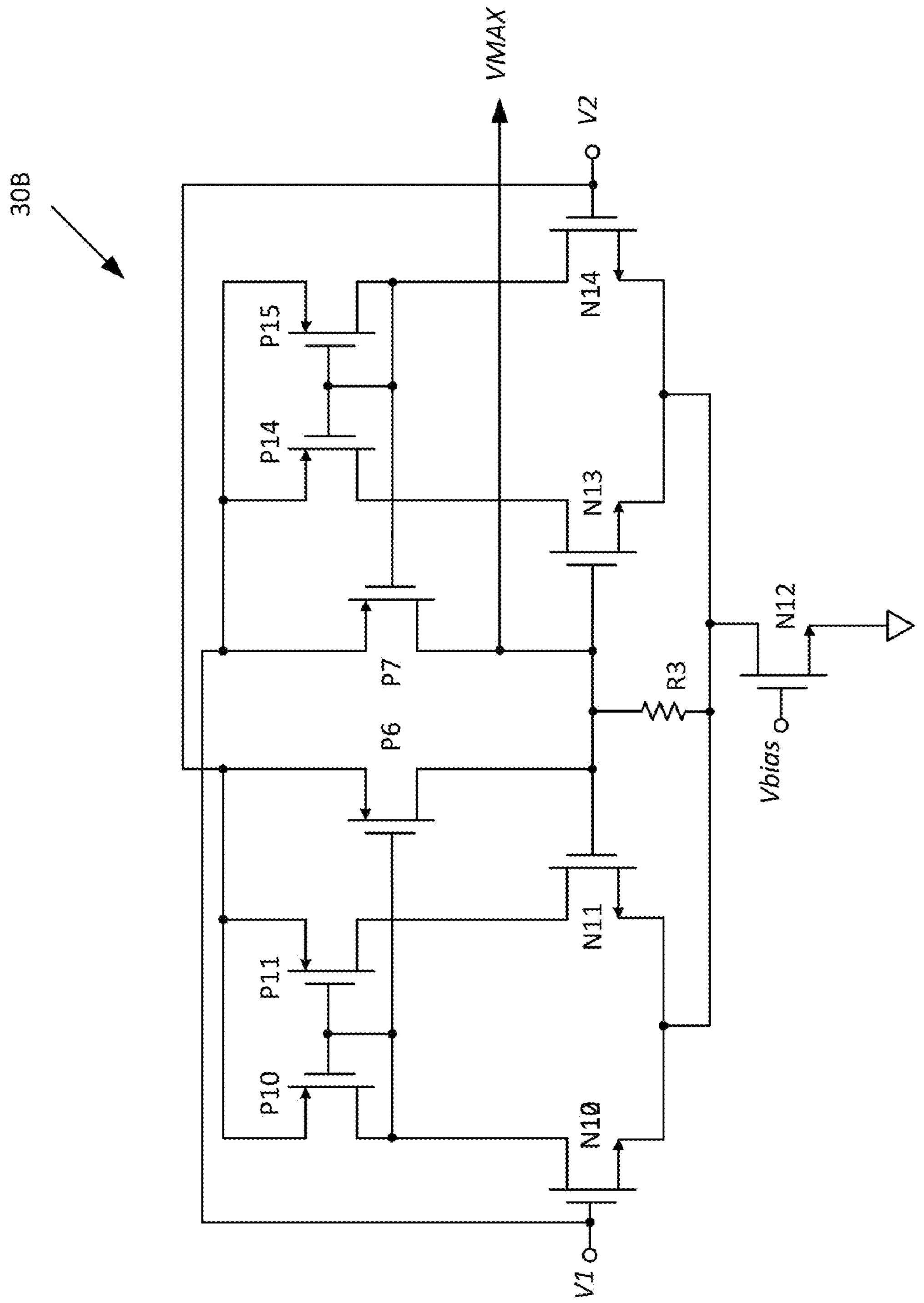
FIG. 5 is a schematic diagram illustrating an example protection voltage generating circuit 30A that may be used in place of protection voltage generating circuit 30 in protection circuit 20 of FIG. 3, in accordance with another embodiment of the disclosure.

Referring now to FIG. 5, a schematic diagram illustrating an example protection voltage generating circuit 30B that may be used in place of protection voltage generating circuit 30 in protection circuit 20 of FIG. 3, in accordance with another embodiment of the disclosure. Example protection voltage generating circuit 30B is identical to protection voltage generating circuit 30A as described above, except that negative feedback is also provided by providing the supply current supplied to the current mirror formed by transistors P10, P11 from voltage V2 and the supply current supplied to the current mirror formed by transistors P14, P15 from voltage V2, rather than from supply voltage $V_{DD}$. While requiring greater output current from bandgap voltage reference 32A and supply-dependent voltage reference 32B, example protection voltage generating circuit 30B provides an additional feedback mechanism ensuring that output voltage VMAX will reflect the greater of voltage V1 and voltage V2, since the maximum voltage at the gates of transistors P12 and P13 of the output circuit will be dictated by the input voltages V1, V2 themselves, but from the other one of the amplifier circuits. The topology illustrated by example protection voltage generating circuit 30B has an advantage of full rail-to-rail operation with respect to both the inputs at the gates of transistors N10 and N14 and the output stage formed by transistors P6 and P7. An implementation of negative protection voltage generator 33 in FIG. 3 may be realized by replacing all of the NFET devices in protection voltage generating circuit 30B with PFET devices, replacing all of the PFET devices protection voltage generating circuit 30B with NFET devices, and exchanging power supply $V_{DD}$ with ground, and vice-versa.

In summary, this disclosure shows and describes circuits for generating one or more protection voltages, and their methods of operation. In some example embodiments, the circuits may include a first circuit for generating a first voltage from a power supply voltage and a second circuit that generates a second voltage from the power supply voltage. The first voltage and the second voltage may have a differing dependence on the power supply voltage so that a difference between the first voltage and the second voltage changes sign for a particular value of the power supply voltage. The circuits may further include a first amplifier circuit having an input coupled to an output of the first circuit that receives the first voltage, and the first amplifier circuit may generate a first output voltage. The circuits may also include a second amplifier circuit having an input coupled to an output of the second circuit receives the second voltage, and the second amplifier circuit may generate a second output voltage. The first amplifier circuit may provide negative feedback to the second amplifier circuit, and the second amplifier circuit may provide negative feedback to the first amplifier circuit. The circuits may also include an output circuit that receives the first output voltage from the first amplifier circuit and the second output voltage from the second amplifier circuit, and generates the protection voltage according to a maximum or a minimum value among the first output voltage and the second output voltage, so that the protection voltage is monotonic with respect to variation of the power supply voltage in a region of the power supply voltage including the particular value of the power supply voltage.

In some example embodiments, the output circuit may generate the protection voltage according to a minimum value among the first output voltage and the second output voltage, so that the protection voltage is equal to a lesser one of the first output voltage or the second output voltage, so that the protection voltage may be a voltage to protect devices at a node of a protected circuit from voltages greater than the protection voltage. In some example embodiments, the output circuit may generate the protection voltage according to a maximum value among the first output voltage and the second output voltage, so that the protection voltage is equal to a greater one of the first output voltage or the second output voltage, so that the protection voltage may be a voltage to protect devices at a node of a protected circuit from voltages less than the protection voltage. In some example embodiments, the first amplifier circuit may provide the negative feedback to the second amplifier circuit and the second amplifier circuit may provide the negative feedback to the first amplifier circuit via a common circuit node.

In some example embodiments, the first amplifier circuit may include a first transistor having a gate coupled to the output of the first circuit and a drain providing the first output voltage and coupled to an input of a first current mirror. In some example embodiments, the first amplifier circuit may include a second transistor having a gate coupled to an output of the output circuit and a drain coupled to an output of the first current mirror. In some example embodiments, the second amplifier circuit may include a third transistor having a gate coupled to the output of the second circuit and a drain providing the second output voltage and coupled to an input of a second current mirror. In some example embodiments, the second amplifier circuit may include a fourth transistor having a gate coupled to an output of the output circuit and a drain coupled to an output of the second current mirror. In some example embodiments, a source of the first transistor, a source of the second transistor, a source of the third transistor and a source of the fourth transistor may be coupled to the common circuit node. In some example embodiments, the output circuit may include a fifth transistor having a gate coupled to the drain of the first transistor or the drain of the second transistor, and a sixth transistor having a gate coupled to the drain of the third transistor or the drain of the fourth transistor. In some example embodiments, a drain of the fifth transistor and a drain of the sixth transistor may be coupled to a power supply rail, and a source of the fifth transistor and a source of the sixth transistor may be coupled together and to an output that provides the protection voltage. In some example embodiments, the gate of the fifth transistor may be coupled to the drain of the first transistor, providing a first high impedance output from the first current mirror, and the gate of the sixth transistor may be coupled to the drain of the third transistor, providing a second high impedance output from the second current mirror. In some example embodiments, the circuit may further include a resistor coupled between the common circuit node and the output of the output circuit.

In some example embodiments, the first amplifier circuit may provide negative feedback to the second amplifier circuit and the second amplifier circuit may provide negative feedback to the first amplifier circuit via separate feedback paths. In some example embodiments, wherein the first amplifier circuit may provide negative feedback to the second amplifier circuit through the output circuit, and wherein the second amplifier circuit may provide negative feedback to the first amplifier circuit through the output circuit. In some example embodiments, the output circuit may include a first transistor having a gate coupled to an output of the first amplifier and a second transistor having a gate coupled to an output of the second amplifier, and a drain of the first transistor may be coupled to the output of the protection voltage generating circuit. In some example embodiments, a drain of the second transistor may be coupled to the output of the first circuit, and a source of the first transistor and a source of the second transistor may be coupled together and to an output that provides the protection output voltage. In some example embodiments, the first amplifier circuit may include a third transistor having a gate coupled to the output of the first circuit and a drain providing the first output voltage and coupled to an input of a first current mirror, and a fourth transistor having a gate coupled to an output of the output circuit and a drain coupled to an output of the first current mirror. In some example embodiments, the second amplifier circuit may include a fifth transistor having a gate coupled to the output of the second circuit and a drain providing the second output voltage coupled to an input of a second current mirror. In some example embodiments the second amplifier circuit may include a sixth transistor having a gate coupled to an output of the output circuit and a drain coupled to an output of the second current mirror, and a source of the third transistor, a source of the fourth transistor, a source of the fifth transistor and a source of the sixth transistor may be coupled to the common circuit node.

While the disclosure has shown and described particular embodiments of the techniques disclosed herein, it will be understood by those skilled in the art that the foregoing and other changes in form, and details may be made therein without departing from the spirit and scope of the disclosure. For example, the techniques shown above may be applied to another type of voltage generating circuit.

What is claimed is:

1. A circuit for generating a protection voltage, comprising:

a first circuit for generating a first voltage from a power supply voltage;

a second circuit that generates a second voltage from the power supply voltage, wherein the first voltage and the second voltage have a differing dependence on the power supply voltage so that a difference between the first voltage and the second voltage changes sign for a particular value of the power supply voltage;

a first amplifier circuit having an input coupled to an output of the first circuit and that receives the first voltage, wherein the first amplifier circuit generates a first output voltage;

a second amplifier circuit having an input coupled to an output of the second circuit and that receives the second voltage, wherein the second amplifier circuit generates a second output voltage, wherein the first amplifier circuit provides negative feedback to the second amplifier circuit, and wherein the second amplifier circuit provides negative feedback to the first amplifier circuit; and an output circuit that receives the first output voltage from the first amplifier circuit and the second output voltage from the second amplifier circuit and generates the protection voltage according to a maximum or a minimum value among the first output voltage and the second output voltage, so that the protection voltage is monotonic with respect to variation of the power supply voltage in a region of the power supply voltage including the particular value of the power supply voltage.

2. The circuit of claim 1, wherein the output circuit generates the protection voltage according to a minimum value among the first output voltage and the second output voltage, so that the protection voltage is equal to a lesser one of the first output voltage or the second output voltage, whereby the protection voltage is a voltage to protect devices at a node of a protected circuit from voltages greater than the protection voltage.

3. The circuit of claim 1, wherein the output circuit generates the protection voltage according to a maximum value among the first output voltage and the second output voltage, so that the protection voltage is equal to a greater one of the first output voltage or the second output voltage, whereby the protection voltage is a voltage to protect devices at a node of a protected circuit from voltages less than the protection voltage.

4. The circuit of claim 1, wherein the first amplifier circuit provides negative feedback to the second amplifier circuit and the second amplifier circuit provides negative feedback to the first amplifier circuit via a common circuit node.

5. The circuit of claim 4, wherein the first amplifier circuit comprises a first transistor having a gate coupled to the output of the first circuit and a drain providing the first output voltage and coupled to an input of a first current mirror, and a second transistor having a gate coupled to an output of the output circuit that provides the protection voltage and a drain coupled to an output of the first current mirror, wherein the second amplifier circuit comprises a third transistor having a gate coupled to the output of the second circuit and a drain providing the second output voltage and coupled to an input of a second current mirror, and a fourth transistor having a gate coupled to the output of the output circuit that provides the protection voltage and a drain coupled to an output of the second current mirror, wherein a source of the first transistor, a source of the second transistor, a source of the third transistor and a source of the fourth transistor are coupled to the common circuit node.

6. The circuit of claim 5, wherein the output circuit comprises a fifth transistor having a gate coupled to the drain of the first transistor or the drain of the second transistor and a sixth transistor having a gate coupled to the drain of the third transistor or the drain of the fourth transistor, wherein a source of the fifth transistor and a source of the sixth transistor are coupled to a power supply rail, and wherein a drain of the fifth transistor and a drain of the sixth transistor are coupled together and to the output of the output circuit that provides the protection voltage.

7. The circuit of claim 6, wherein the gate of the fifth transistor is coupled to the drain of the first transistor, providing a first high impedance output from the first current mirror, and wherein the gate of the sixth transistor is coupled to the drain of the third transistor, providing a second high impedance output from the second current mirror.

8. The circuit of claim 6, further comprising a resistor coupled between the common circuit node and the output of the output circuit.

9. The circuit of claim 1, wherein the first amplifier circuit provides negative feedback to the second amplifier circuit and the second amplifier circuit provides negative feedback to the first amplifier circuit via separate feedback paths.

10. The circuit of claim 9, wherein the first amplifier circuit provides negative feedback to the second amplifier circuit through the output circuit, and wherein the second amplifier circuit provides negative feedback to the first amplifier circuit through the output circuit.

11. The circuit of claim 10, wherein the output circuit comprises a first transistor having a gate coupled to an output of the first amplifier and a second transistor having a gate coupled to an output of the second amplifier, wherein a source of the first transistor is coupled to the output of the second circuit and wherein a source of the second transistor is coupled to the output of the first circuit, and wherein a drain of the first transistor and a drain of the second transistor are coupled together and to an output of the output circuit that provides the protection voltage.

12. The circuit of claim 11, wherein the first amplifier circuit comprises a third transistor having a gate coupled to the output of the first circuit and a drain providing the first output voltage and coupled to an input of a first current mirror, and a fourth transistor having a gate coupled to an output of the output circuit and a drain coupled to an output of the first current mirror, wherein the second amplifier circuit comprises a fifth transistor having a gate coupled to the output of the second circuit and a drain providing the second output voltage and coupled to an input of a second current mirror, and a sixth transistor having a gate coupled to an output of the output circuit and a drain coupled to an output of the second current mirror, wherein a source of the third transistor, a source of the fourth transistor, a source of the fifth transistor and a source of the sixth transistor are coupled to the common circuit node.

13. A method of protecting devices at a node of a protected circuit from an over-voltage or under-voltage condition, the method comprising:
- generating, by a first circuit, a first voltage from a power supply voltage
- generating, by a second circuit, a second voltage from the power supply voltage, wherein the first voltage and the second voltage have a differing dependence on the power supply voltage so that a difference between the first voltage and the second voltage changes sign for a particular value of the power supply voltage;
- generating a first output voltage by a first amplifier circuit that receives the first voltage;
- generating a second output voltage by a second amplifier circuit that receives the second voltage, wherein the second amplifier circuit generates a second output voltage;
- providing negative feedback to the second amplifier circuit from the second amplifier circuit to the first amplifier circuit;
- providing negative feedback to the first amplifier circuit to the second amplifier circuit; and
- generating a protection voltage by an output circuit that receives the first output voltage from the first amplifier circuit and the second output voltage from the second amplifier circuit and generates the protection voltage according to a maximum or a minimum value among the first output voltage and the second output voltage, so that the protection voltage is monotonic with respect to variation of the power supply voltage in a region of the power supply voltage including the particular value of the power supply voltage.

14. The method of claim 13, wherein the output circuit generates the protection voltage according to a minimum value among the first output voltage and the second output voltage, so that the protection voltage is equal to a lesser one of the first output voltage or the second output voltage, whereby the protection voltage is a voltage to protect devices at the node of the protected circuit from voltages greater than the protection voltage.

15. The method of claim 13, wherein the output circuit generates the protection voltage according to a maximum value among the first output voltage and the second output voltage, so that the protection voltage is equal to a greater one of the first output voltage or the second output voltage, whereby the protection voltage is a voltage to protect devices at the node of a protected circuit from voltages less than the protection voltage.

16. The method of claim 13, wherein the first amplifier circuit provides negative feedback to the second amplifier circuit and the second amplifier circuit provides negative feedback to the first amplifier circuit via a common circuit node.

17. The method of claim 16, wherein the first amplifier circuit comprises a first transistor having a gate coupled to the output of the first circuit and a drain providing the first output voltage and coupled to an input of a first current mirror, and a second transistor having a gate coupled to an output of the output circuit and a drain coupled to an output of the first current mirror, wherein the second amplifier circuit comprises a third transistor having a gate coupled to the output of the second circuit and a drain providing the second output voltage and coupled to an input of a second current mirror, and a fourth transistor having a gate coupled to an output of the output circuit and a drain coupled to an output of the second current mirror, wherein a source of the first transistor, a source of the second transistor, a source of the third transistor and a source of the fourth transistor are coupled to the common circuit node.

18. The method of claim 17, wherein the output circuit comprises a fifth transistor having a gate coupled to the drain of the first transistor or the drain of the second transistor and a sixth transistor having a gate coupled to the drain of the third transistor or the drain of the fourth transistor, wherein a source of the fifth transistor and a source of the sixth transistor are coupled to a power supply rail, and wherein a drain of the fifth transistor and a drain of the sixth transistor are coupled together and to an output that provides the protection voltage.

19. The method of claim 17, wherein the gate of the fifth transistor is coupled to the drain of the first transistor, providing a first high impedance output from the first current mirror, and wherein the gate of the sixth transistor is coupled to the drain of the third transistor, providing a second high impedance output from the second current mirror.

20. The method of claim 18, further comprising a resistor coupled between the common circuit node and the output of the output circuit.

21. The method of claim 13, wherein the first amplifier circuit provides negative feedback to the second amplifier circuit and the second amplifier circuit provides negative feedback to the first amplifier circuit via separate feedback paths.

22. The method of claim 21, wherein the first amplifier circuit provides negative feedback to the second amplifier circuit through the output circuit, and wherein the second amplifier circuit provides negative feedback to the first amplifier circuit through the output circuit.

23. The method of claim 22, wherein the output circuit comprises a first transistor having a gate coupled to an output of the first amplifier and a second transistor having a gate coupled to an output of the second amplifier, wherein a source of the first transistor is coupled to the output of the second circuit and wherein a source of the second transistor is coupled to the output of the first circuit, and wherein a drain of the first transistor and a drain of the second transistor are coupled together and to an output that provides the protection voltage.

24. The method of claim 23, wherein the first amplifier circuit comprises a third transistor having a gate coupled to the output of the first circuit and a drain providing the first output voltage and coupled to an input of a first current mirror, and a fourth transistor having a gate coupled to an output of the output circuit and a drain coupled to an output of the first current mirror, wherein the second amplifier circuit comprises a fifth transistor having a gate coupled to the output of the second circuit reference and a drain providing the second output voltage and coupled to an input of a second current mirror, and a sixth transistor having a gate coupled to an output of the output circuit and a drain coupled to an output of the second current mirror, wherein a source of the third transistor, a source of the fourth transistor, a source of the fifth transistor and a source of the sixth transistor are coupled to the common circuit node.

* * * * *